(12) United States Patent
Morozov et al.

(10) Patent No.: US 12,181,666 B2
(45) Date of Patent: Dec. 31, 2024

(54) SYSTEM OF VIRTUAL IMAGE PROJECTION ON SCREEN WITH EFFECT OF ELIMINATING INFLUENCE OF SOLAR RADIATION

(71) Applicant: SAMSUNG ELECTRONICS CO., LTD., Suwon-si (KR)

(72) Inventors: Aleksander Victorovich Morozov, Moscow (RU); Igor Vitalievich Yanusik, Moscow (RU); Anastasiia Andreevna Kalinina, Moscow (RU); Jinho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 845 days.

(21) Appl. No.: 17/329,961

(22) Filed: May 25, 2021

(65) Prior Publication Data
US 2021/0364792 A1  Nov. 25, 2021

(30) Foreign Application Priority Data

May 25, 2020 (RU) .......................... RU 2020117177
Mar. 12, 2021 (KR) .......................... 10-2021-0032727

(51) Int. Cl.
*G02B 27/01* (2006.01)
*G02B 27/28* (2006.01)

(52) U.S. Cl.
CPC ....... *G02B 27/0101* (2013.01); *G02B 27/288* (2013.01); *G02B 2027/012* (2013.01)

(58) Field of Classification Search
CPC .............. G02B 27/0101; G02B 27/288; G02B 2027/012; G02B 5/208; G02B 5/281; G02B 27/01; G02B 27/28; G02B 17/02; G02B 5/20; G02B 5/30; G02B 27/18; G02B 5/3083; G03B 21/20; G03B 21/28; G03B 21/62; G03V 21/2073
See application file for complete search history.

(56) References Cited

U.S. PATENT DOCUMENTS

| | | | |
|---|---|---|---|
| 6,273,567 B1 | 8/2001 | Conner et al. | |
| 8,197,067 B2 | 6/2012 | Suzuki | |
| 8,456,596 B2 | 6/2013 | Jun et al. | |
| 2013/0182302 A1* | 7/2013 | Shikii | H04N 9/3161 359/13 |
| 2014/0177040 A1 | 6/2014 | Uehara | |
| 2015/0098029 A1 | 4/2015 | Sato et al. | |
| 2015/0307389 A1* | 10/2015 | He | C03C 3/118 359/361 |
| 2016/0025973 A1 | 1/2016 | Guttag et al. | |

(Continued)

FOREIGN PATENT DOCUMENTS

| | | |
|---|---|---|
| JP | 2003-121793 A | 4/2003 |
| JP | 2017-116882 A | 6/2017 |

(Continued)

*Primary Examiner* — Balram T Parbadia
(74) *Attorney, Agent, or Firm* — Sughrue Mion, PLLC

(57) ABSTRACT

Provided is a system of projection of a virtual image on a screen with the effect of eliminating the influence of solar radiation, the system that polarizes solar radiation in an optical path along which solar radiation is delivered to a display through a screen, eliminates and filters out ultraviolet and infrared components, and transmits only radiation of an operating range of the display to the display.

20 Claims, 9 Drawing Sheets

(56) References Cited

U.S. PATENT DOCUMENTS

| | | | |
|---|---|---|---|
| 2016/0150218 A1 | 5/2016 | Yoon | |
| 2017/0052369 A1* | 2/2017 | Shimatani | G02B 27/01 |
| 2017/0139206 A1* | 5/2017 | Sugikawa | G02B 5/0833 |
| 2017/0336628 A1* | 11/2017 | Kim | B60K 35/00 |
| 2018/0101005 A1 | 4/2018 | Yamazoe | |
| 2018/0180878 A1* | 6/2018 | Yokoe | G02B 27/286 |
| 2018/0348515 A1* | 12/2018 | Kuzuhara | B60K 35/00 |
| 2018/0356634 A1* | 12/2018 | Riebe | B60K 35/00 |
| 2019/0317325 A1 | 10/2019 | Malinovskaya et al. | |
| 2020/0026073 A1* | 1/2020 | Nambara | G03B 21/28 |
| 2020/0055400 A1* | 2/2020 | Edmonds | H04N 9/3167 |
| 2020/0189363 A1* | 6/2020 | Sugiyama | B60K 35/00 |
| 2021/0191117 A1* | 6/2021 | Fuchida | B60K 35/50 |
| 2022/0003996 A1* | 1/2022 | Asanoi | G02B 5/3033 |
| 2022/0221718 A1* | 7/2022 | Anzai | G02B 5/3025 |
| 2023/0085544 A1* | 3/2023 | Schardt | G02B 27/0101 359/13 |

FOREIGN PATENT DOCUMENTS

| | | |
|---|---|---|
| JP | 2017-125882 A | 7/2017 |
| JP | 2019-211490 A | 12/2019 |

* cited by examiner

SYSTEM OF VIRTUAL IMAGE PROJECTION ON SCREEN WITH EFFECT OF ELIMINATING INFLUENCE OF SOLAR RADIATION

CROSS-REFERENCE TO RELATED APPLICATION

This application claims priority from Russian Patent Application No. 2020117177, filed on May 25, 2020, in the Russian Federal Service for Intellectual Property, and Korean Patent Application No. 10-2021-0032727, filed on Mar. 12, 2021, in the Korean Intellectual Property Office, the disclosures of which are incorporated herein by reference in their entireties.

BACKGROUND

1. Field

Methods and apparatuses consistent with example embodiments relate to augmented reality devices. More particularly, example embodiments relate to the projection of a virtual image onto an augmented reality screen.

2. Description of Related Art

Head-up display (HUD) systems for projecting an image onto a transparent or translucent screen are becoming more popular. Such systems are used in virtual reality helmets, as well as for projection of an image, for example, onto the windshield of a car, etc. Windshield projection systems may be borrowed from military aviation, and with the help of such systems, pilots can read flight data not from the instrument panel, but from the aircraft windshield. When the projection display image is projected onto the windshield, there is a problem of overheating of the head-up display by solar radiation from the environment through the windshield. A system of the projection display for projection of an image includes a display, projection optics, and a windshield, and solar radiation passing through the windshield causes strong illumination of the display, and the display begins to overheat, which leads to distorted color transmission from the display and, ultimately, to display damage.

There are proposed various solutions to solve the problem of overheating of the display by solar radiation. For example, fan systems may be used, but fan systems may be bulky and noisy. Water cooling solutions are also available, but water cooling solution systems may be complex and expensive.

A method of lowering the temperature of the display by lowering the backlight illumination when the amount of solar radiation greatly increases has been used. However, in this case, the system usage may be limited.

Accordingly, there is a demand for technology for eliminating harmful solar radiation and preventing overheating of a display by solar radiation and distorted color transmission from the display and display damage, caused by overheating.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided a system for projection of an image, the system including a screen, a polarizing filter, a selective dichroic filter, a first mirror, a second mirror, and a display, wherein the polarizing filter, the selective dichroic filter, the first mirror, and the second mirror are disposed between the screen and the display, wherein the polarizing filter is configured to polarize solar radiation transmitted through the screen and incident on the polarizing filter, wherein the selective dichroic filter is disposed on a side of the polarizing filter opposite to the screen, the selective dichroic filter being configured to transmit at least one of radiation of an operating range of the display among the radiation polarized by the polarizing filter, an ultraviolet component of the radiation, and an infrared component of the radiation, and to reflect remaining radiation corresponding to wavelengths that are not transmitted by the first mirror, wherein the first mirror is configured to reflect radiation transmitted through the selective dichroic filter to the second mirror, and wherein the second mirror is configured to transmit or absorb at least one of an ultraviolet component of the radiation and an infrared component of the radiation reflected from the first mirror, and to direct remaining radiation corresponding to wavelengths that are not transmitted or absorbed by the second mirror, among the radiation reflected from the first mirror, to the display.

The system may further include a radiation source located on a side of the display opposite to the screen.

The polarizing filter may be one of a linear s-polarizer with a quarter-wave plate, a linear p-polarizer with a quarter-wave plate, a circular polarizer with left polarization, a circular polarizer with right polarization, a linear s-polarizer, and a linear p-polarizer.

According to another aspect of an example embodiment, there is provided a system for projection of an image, the system including a screen, a polarizing filter, a selective dichroic filter, a filter, a first mirror, a second mirror, and a display, wherein the polarizing filter, the selective dichroic filter, the first mirror, and the second mirror are disposed between the screen and the display, wherein the polarizing filter is configured to polarize solar radiation transmitted through the screen, wherein the selective dichroic filter is disposed on a side of the polarizing filter opposite to the screen, the selective dichroic filter being configured to transmit at least one of radiation of an operating range of the display among the radiation polarized by the polarizing filter, an ultraviolet component of the radiation, and an infrared component of the radiation, and to reflect remaining radiation wavelengths, wherein the filter is configured to absorb the ultraviolet component of the radiation and the infrared component of the radiation and to transmit radiation corresponding to all other wavelengths that are not absorbed by the filter, wherein the first mirror is configured to reflect radiation transmitted through the polarizing filter, the selective dichroic filter, and the filter to the second mirror, and wherein the second mirror is configured to reflect the radiation reflected from the first mirror to the display.

The system may further include a radiation source disposed on a side of the display opposite to the screen.

The filter may be disposed between the screen and the polarizing filter or on a side of the selective dichroic filter opposite to the polarizing filter.

The polarizing filter may be one of a linear s-polarizer with a quarter-wave plate, a linear p-polarizer with a quarter-wave plate, a circular polarizer with left polarization, a circular polarizer with right polarization, a linear s-polarizer, and a linear p-polarizer.

According to another aspect of an example embodiment, there is provided a system for projection of an image, the system including a screen, a first mirror, a second mirror, a polarizing filter, a selective dichroic filter, and a display, wherein the first mirror, the second mirror, the polarizing filter, and the selective dichroic filter are disposed between the screen and the display, wherein the first mirror is configured to reflect solar radiation transmitted through the screen to the second mirror, wherein the second mirror is configured to transmit or absorb at least one of an ultraviolet component of the solar radiation and an infrared component of the solar radiation, and to reflect radiation corresponding to remaining wavelengths that are not transmitted or absorbed by the second mirror, among the solar radiation, to the polarizing filter, wherein the polarizing filter is configured to polarize the radiation reflected from the second mirror, and wherein the selective dichroic filter is disposed on a side of the polarizing filter opposite to the screen, the selective dichroic filter being configured to transmit radiation of an operating range of the display among the radiation polarized through the polarizing filter, to direct the transmitted radiation to the display, and to reflect radiation corresponding to remaining wavelengths that are not transmitted by the selective dichroic filter.

The system may further include a radiation source disposed on a side of the display opposite to the screen.

The polarizing filter may be one of a linear s-polarizer with a quarter-wave plate, a linear p-polarizer with a quarter-wave plate, a circular polarizer with left polarization, a circular polarizer with right polarization, a linear s-polarizer, and a linear p-polarizer.

According to another aspect of an example embodiment, there is provided a system for projection of an image, the system including a screen, a polarizing filter, a first mirror, a second mirror, and a display, wherein the polarizing filter, the first mirror, and the second mirror are disposed between the screen and the display, wherein the polarizing filter is configured to polarize solar radiation, wherein the first mirror is configured to reflect at least one or radiation of an operating range of the display among the radiation polarized through the polarizing filter, an ultraviolet component of the polarized radiation, and an infrared component of the polarized radiation to the second mirror, and to absorb radiation corresponding to all other wavelengths that are not reflected by the first mirror, among the radiation polarized through the polarizing filter, and wherein the second mirror is configured to transmit or absorb at least one of an ultraviolet component of the radiation reflected from the first mirror and an infrared component of the radiation reflected from the first mirror, and to reflect radiation corresponding to all other wavelengths that are not transmitted or absorbed by the second mirror, among the radiation reflected from the first mirror and direct the reflected radiation to the display.

The first mirror may be a selective dichroic mirror.

The system may further include a radiation source disposed on a side of the display opposite to the screen.

The polarizing filter may be one of a linear s-polarizer with a quarter-wave plate, a linear p-polarizer with a quarter-wave plate, a circular polarizer with left polarization, a circular polarizer with right polarization, a linear s-polarizer, and a linear p-polarizer.

According to another aspect of an example embodiment, there is provided a system for projection of an image, the system including a screen, a polarizing filter, a first mirror, a second mirror, and a display, wherein the polarizing filter, the first mirror, and the second mirror are disposed between the screen and the display, wherein the polarizing filter is configured to polarize solar radiation, wherein the first mirror is configured to transmit or absorb at least one of an ultraviolet component of the radiation polarized through the polarizing filter and an infrared component of the radiation polarized through the polarizing filter, and to reflect radiation corresponding to all other wavelengths that are not transmitted or absorbed by the first mirror, among the radiation polarized through the polarizing filter, to the second mirror, and wherein the second mirror is configured to reflect radiation of an operating range of the display, among the radiation reflected from the first mirror, to the display, and to absorb all other wavelengths that are not reflected by the second mirror, among the radiation reflected from the first mirror.

The second mirror may be a selective dichroic mirror.

The system may further include a radiation source disposed on a side of the display opposite to the screen.

The polarizing filter may be one of a linear s-polarizer with a quarter-wave plate, a linear p-polarizer with a quarter-wave plate, a circular polarizer with left polarization, a circular polarizer with right polarization, a linear s-polarizer, and a linear p-polarizer.

The polarizing filter may include a linear s-polarizer configured to transmit linear s-polarized radiation, and a quarter-wave plate configured to convert the linear s-polarized radiation to a circular polarized radiation.

A head-up-display may include the system

BRIEF DESCRIPTION OF THE DRAWINGS

The above and/or other aspects will be more apparent by describing example embodiments with reference to the accompanying drawings, in which.

DETAILED DESCRIPTION

Figure 1:
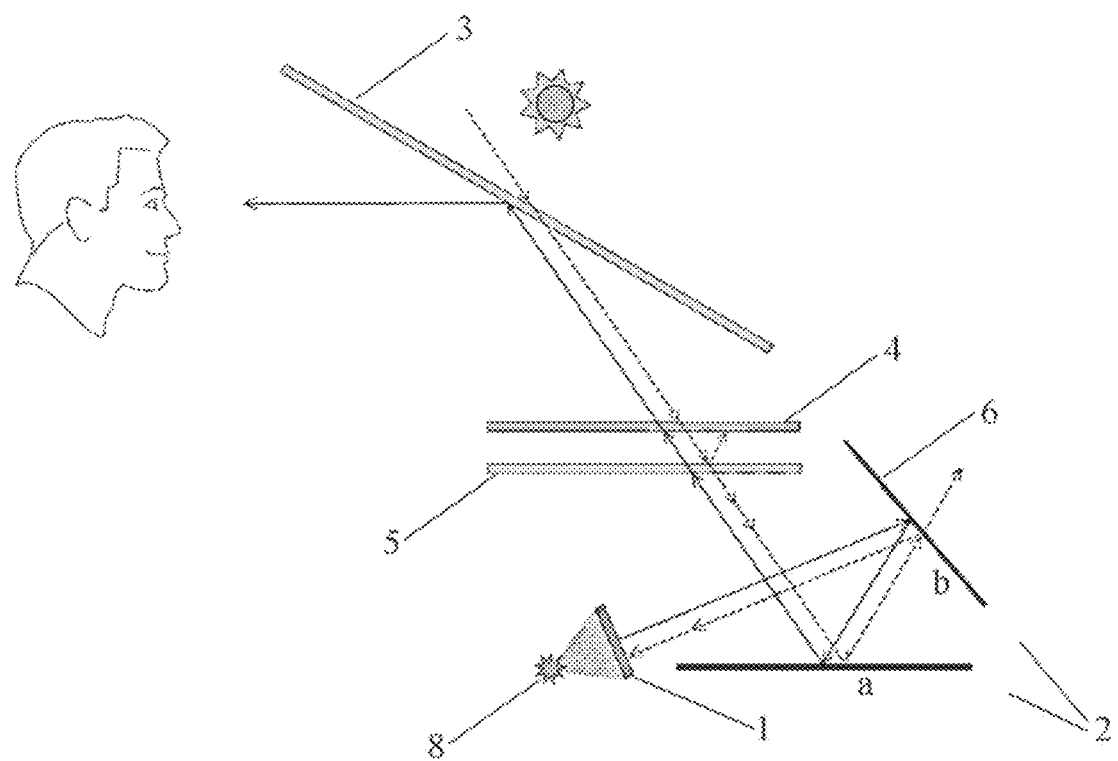
FIG. 1 illustrates an optical scheme of a system for eliminating solar illumination of a display in an image projection system on a screen according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Hereinafter, a system of virtual image projection on a screen, with the effect of eliminating the influence of solar radiation, according to an example embodiment will be described in detail with reference to FIGS. 1 to 8D.

Example embodiments of the present disclosure may eliminate or reduce overheating of a display in a device for projection of an image onto a screen, as well as resolving the problem of image distortion from a display caused by illumination of the display by radiation from the environment. According to example embodiments, any transparent or semi-transparent surface may be used as a screen to project the image.

The device for projection of the image onto the screen may include lighting optics, a display, projection optics, a screen. By the projection optics and the screen, a displayed image may be redirected into the eyes of an observer from the screen.

Solar radiation that may be radiation from the external environment, may also be incident on the screen and travel the same optical path as radiation of an image from the display, in an opposite direction, and may be focused on the display. Solar radiation being focused on the display may cause the display to overheat, which may lead to device breakdown and increase the likelihood of ignition. To eliminate or reduce overheating of the display, the solar illumination on the display may need to be eliminated.

Example embodiments may reduce thermal overheating of the display device for projection of a virtual image on a transparent screen by minimizing the load of solar radiation on the display.

To reduce thermal overheating of the display device, example embodiments may eliminate a part of unpolarized solar radiation, partially eliminate the visible spectrum of solar radiation, and/or eliminate the infrared and ultraviolet spectrum of solar radiation.

FIG. 1 illustrates an optical scheme of a system for eliminating solar illumination of a display in an image projection system on a screen according to an example embodiment.

The system of FIG. 1 is a system of image projection on a transparent screen, with the effect of eliminating the influence of solar radiation.

The system or device for projection of the image on the screen includes a display 1, a mirror optics system 2, and a screen 3. The mirror optics system 2 may include mirrors, for example, a first mirror a and a second mirror b. In general, the radiation from the display 1 (shown by the solid arrow) is reflected from the mirror optics system 2 and is projected onto the screen 3. A user may view the image projected from the display 1 to the screen 3.

The influence of solar radiation may be reduced or eliminated by optical elements such as, for example, a polarizing filter 4, a selective dichroic filter 5, and a coating 6 applied to one of the mirrors included in the mirror optics system 2.

The selective dichroic filter 5 transmits only the wavelengths of operating radiation that is a partial region of visible rays on which the display 1 operates, as well as the ultraviolet component of solar radiation and the infrared component of solar radiation. The coating 6 applied to one of the mirrors transmits or absorbs ultraviolet radiation and infrared radiation and reflects the rest of the solar radiation in the region of visible rays.

According to an example embodiment, the system for projection of an image onto a screen with the effect of eliminating the influence of solar radiation includes the elements located in the direction of solar radiation including a screen 3, a polarizing filter 4 configured to polarize solar radiation, a selective dichroic filter 5 configured to transmit radiation that is in a partial region of visible rays of an operating range of the display 1, an ultraviolet component of solar radiation, and an infrared component of solar radiation, and to reflect all other wavelengths in the region of visible rays of solar radiation, a first mirror a configured to reflect any radiation, a second mirror b configured to transmit or absorb an ultraviolet solar component and an infrared solar component and to reflect the rest of the solar radiation component, and a display 1.

The display 1 may have a separate lighting part 8 that may be a backlight.

Radiation from the sun passes through the screen 3 as illustrated in dashed lines in FIG. 1, and is incident on the polarizing filter 4, on which the radiation from the sun is polarized. In FIG. 1, the path of rays of solar radiation is shown by a dashed line, and the path of rays from the display is shown by a solid line. The polarizer transmits only the linearly polarized part of the solar radiation, thereby eliminating up to 50% of solar illumination. The polarized solar radiation that passes the polarizing filter 4 is incident on the selective dichroic filter 5, which partially eliminates the visible spectrum of solar radiation. The selective dichroic filter 5 transmits the radiation in a partial region of visible rays of the operating range of the display 1, the ultraviolet component of solar radiation, and the infrared component of solar radiation, and reflects the remaining of the visible radiation. Further, the remaining solar radiation in the radiation of the operating range of the display 1, the ultraviolet component of solar radiation, and the infrared component of solar radiation is incident on the first mirror a, and is reflected from the first mirror a and is incident on the second mirror b, on which the coating 6 is applied. The second mirror b may absorb or transmit the ultraviolet component and the infrared component of solar radiation, and reflect the remaining part of solar radiation that is not absorbed or transmitted. The remaining solar radiation that is reflected by the second mirror b is incident on the display 1. The solar radiation processed in this way may have a very low intensity and power, and thus, may not heat the display 1. In addition, the processed solar radiation may not interfere with the operation of the display 1 and distort the image projected from the display 1 to the screen 3.

Accordingly, only a diminutive amount of radiation corresponding to the operating wavelengths of the display 1, among the solar radiation, may be delivered to the display 1 of FIG. 1.

Figure 2:
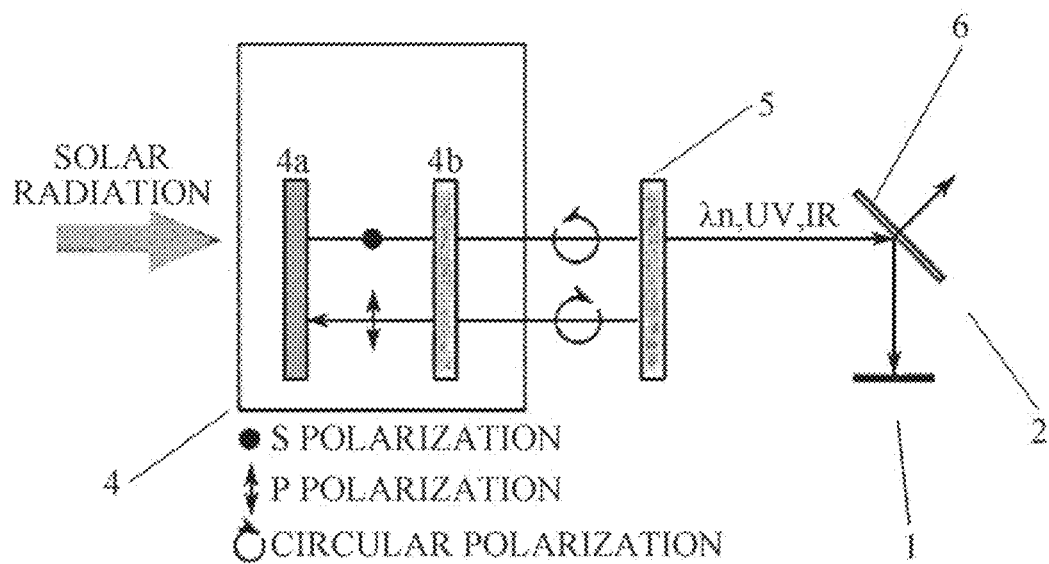
FIG. 2 illustrates an example of a polarizing filter that is a linear s-polarizer in combination with a quarter-wave plate according to an example embodiment.

FIG. 2 illustrates an example of a polarizing filter that is a linear s-polarizer in combination with a quarter-wave plate according to an example embodiment.

As shown in FIG. 2, the polarizing filter 4 in FIG. 1 may include a linear s-polarizer 4a and a quarter-wave plate 4b. The linear s-polarizer 4a transmits only s-polarized radiation, and absorbs the rest of the radiation. Linear s-polarized light passes through the quarter-wave plate 4b without attenuation, but the linear s-polarized light's polarization is converted to circular polarization. The narrow spectral lines of the visible spectrum are partially transmitted by the selective dichroic filter 5, and the remaining part of the radiation is reflected and does not pass further, and returns to the quarter-wave plate 4b, where the remaining part of the radiation is converted back to linear polarization while being rotated by 90 degrees. After passing the quarter-wave plate 4b, the remaining part of the radiation is incident on the linear s-polarizer 4a and is absorbed by linear s-polarizer 4a. The linear s-polarizer 4a and the quarter-wave plate 4b may be made of crystalline materials, for example, quartz, and may need to be located in the projection device in accordance with the orientation of their axes and the polarization axis of the display 1.

The quarter-wave plate 4b may also be used to convert elliptically polarized (or unpolarized) radiation from the display 1 to linear s-polarized light. However, embodiments are not limited thereto. For example, instead of an s-polarizer, a p-polarizer may be used. However, the linear s-polarizer may have a higher Fresnel reflection from the surface of the screen 3. When the display 1 emits elliptically polarized light, the elliptically polarized light may need to be converted to s-polarized light to achieve maximum reflection from the windshield, since the reflection coefficient of the s-polarization is much higher than the reflection coefficient of the p-polarization. This is because the reflection coefficient and transmission for polarization are determined by the Fresnel formulas.

The selective dichroic filter 5 may include multiple layers, and the thickness of multiple layers may be calculated based on the spectrum wavelength range. The selective dichroic filter 5 may be a glass substrate on which layers of dielectric materials are applied, and the thickness and number of layers may be calculated in such a way that only predetermined wavelengths are reflected. Such filters may be used in laser resonators, beam splitters, interferometers, and the like. The spectrum wavelength range corresponds to the operating wavelengths $\lambda n$ and the wavelengths of the infrared (IR) and ultraviolet (UV) ranges of the display 1.

The coating applied to the mirror, which transmits IR and UV radiation ranges, may include multiple layers, and the thickness of is the multiple layers may be calculated in accordance with the transmission of the spectral ranges. The performance of a dielectric mirror is based on the interference of light rays reflected from the boundaries between the layers of the dielectric coating. The layer thicknesses determine the position of the maximum in the transmission curve. The width of the filter passband and the degree of suppression of the unnecessary part of the spectrum depend on the number of layers. The solar radiation processed in this way may be converted into radiation with selective wavelengths, which are the operating wavelengths for the display 1.

Figure 3:
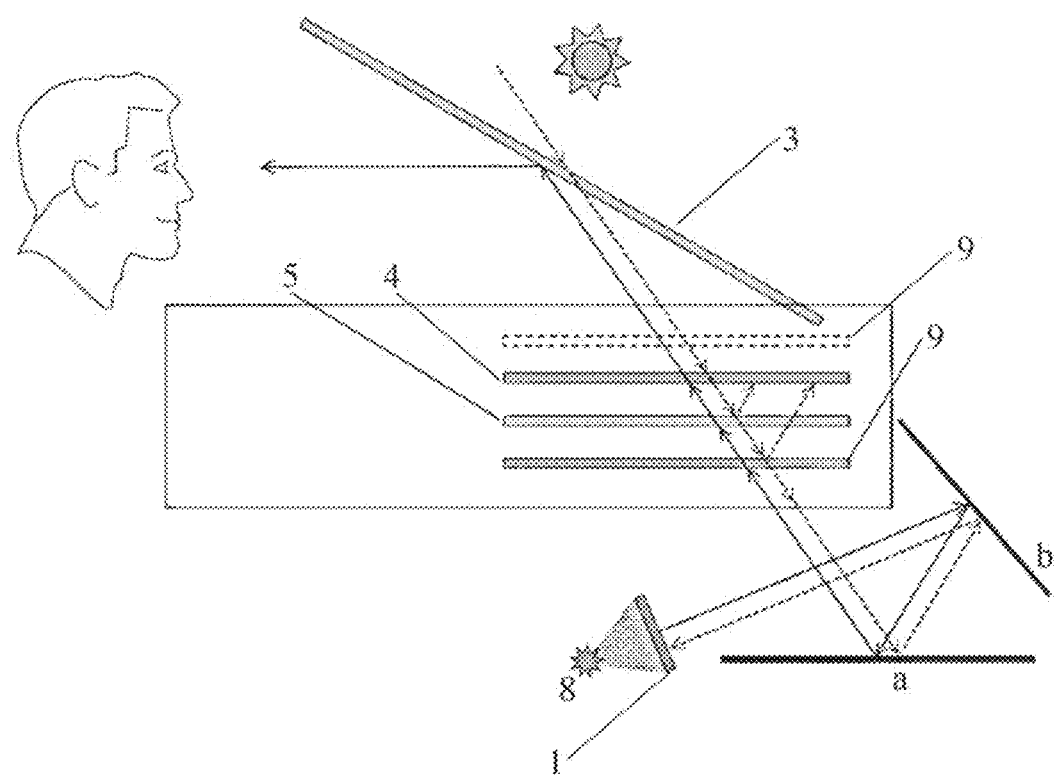
FIG. 3 illustrates an example including an ultraviolet and infrared absorbing filter according to an example embodiment.

FIG. 3 illustrates an example including an ultraviolet and infrared absorbing filter according to an example embodiment.

Referring to FIG. 3, a system for projection of an image onto a screen with the effect of eliminating the influence of solar radiation on a display may include a screen 3, a display 1, a polarizing filter 4, a selective dichroic filter 5, an ultraviolet/infrared (UV/IR) filter 9, a first mirror a, and a second mirror b.

The polarizing filter 4, the selective dichroic filter 5, the UV/IR filter 9, the first mirror a, and the second mirror b are located between the screen 3 and the display 1 with respect to an optical path of light.

The solar radiation, shown by the dashed arrow, passes through the screen 3 and is incident on the polarizing filter 4. Here, the path of the rays of the sun is shown by the dashed line, and the path of the rays from the display 1 is shown by the solid line. The polarizing filter 4 allows only the linearly polarized portion of the solar radiation to pass through, eliminating 50% of the solar illumination. Further, the solar radiation is incident on the selective dichroic filter 5, which partially eliminates the visible spectrum of solar radiation. The selective dichroic filter 5 transmits radiation in a partial region of visible rays of an operating range of the display 1, an ultraviolet component of solar radiation, and an infrared component of solar radiation, and reflects the rest of the visible radiation. Further, the solar radiation is incident on the UV/IR filter 9, which is configured to absorb the ultraviolet component and the infrared component of the solar radiation and transmit the rest of the radiation wavelengths in a visible range. The UV/IR filters 9 may be located both before the polarizing filter 4 and after the selective dichroic filter 5. After the polarizing filter 4 and the selective dichroic filter 5, the remaining solar radiation in a partial region of visible rays after filtering is incident on the first mirror a, which directs the solar radiation to the second mirror b. The second mirror b in turn reflects the remaining solar radiation onto the display.

Also, as in the example embodiment, a lighting system may be located behind the display 1, and the polarizing filter 4 may be an s-polarizer in combination with a quarter-wave plate.

Figure 4:
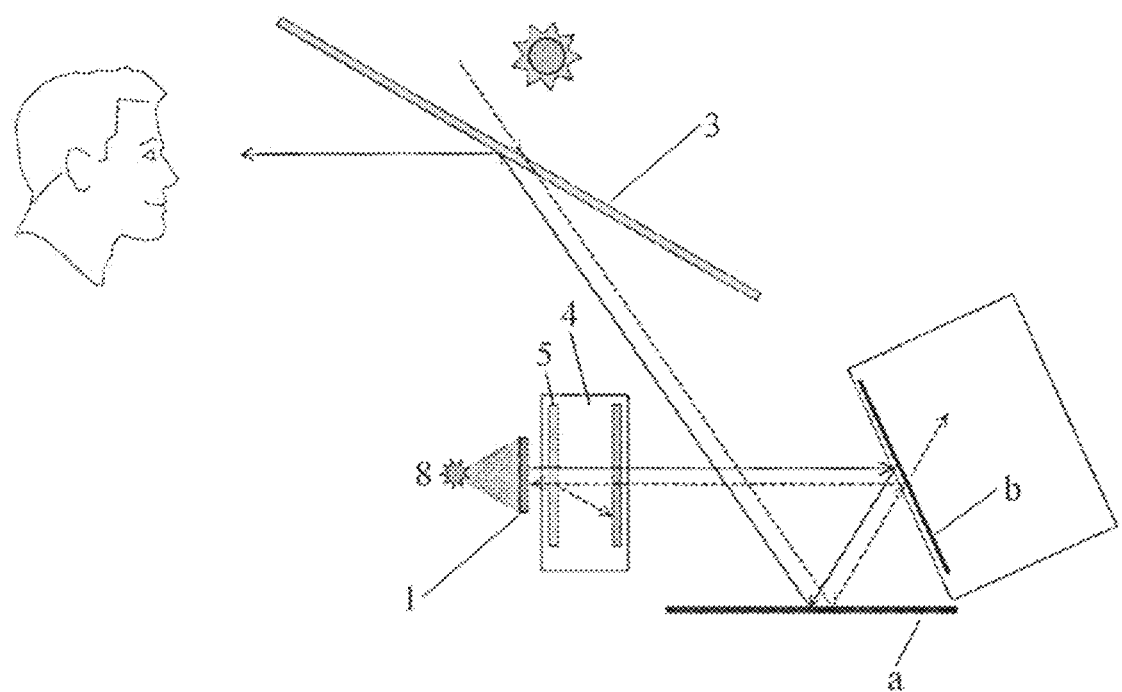
FIG. 4 illustrates an example of a polarizing filter and a selective dichroic filter being located immediately after a display according to an example embodiment.

FIG. 4 illustrates an example of a polarizing filter and a selective dichroic filter being located immediately after a display according to an example embodiment.

In the example embodiment of FIG. 4, a system for projection of an image onto a transparent screen with the effect of eliminating the influence of solar radiation may include a screen 3, a display 1, a first mirror a, a second mirror b, a polarizing filter 4, and a selective dichroic filter 5.

Here, the first mirror a, the second mirror b, the polarizing filter 4, and the selective dichroic filter 5 are located between the screen 3 and the display 1 with respect to an optical path of light.

The first mirror a is positioned in such a way that it receives solar radiation passing through the screen 3. Here, the path of the rays of the sun is shown by the dashed line, and the path of the rays from the display is shown by the solid line. Solar radiation is reflected from the first mirror a and directed to the second mirror b. The second mirror b is configured to transmit or absorb an ultraviolet component of solar radiation and an infrared component of solar radiation and reflect all other radiation wavelengths to the polarizing filter 4.

The polarizing filter 4 may only transmits the linearly polarized part of the solar radiation, thereby eliminating up to 50% of the solar illumination. The polarized solar radiation may be incident on the selective dichroic filter 5, which transmits solar radiation of an operating range of the display 1 and eliminates all other wavelengths of visible spectrum of solar radiation. Solar radiation filtered by the dichroic filter 5 is incident on the display 1.

Figure 5:
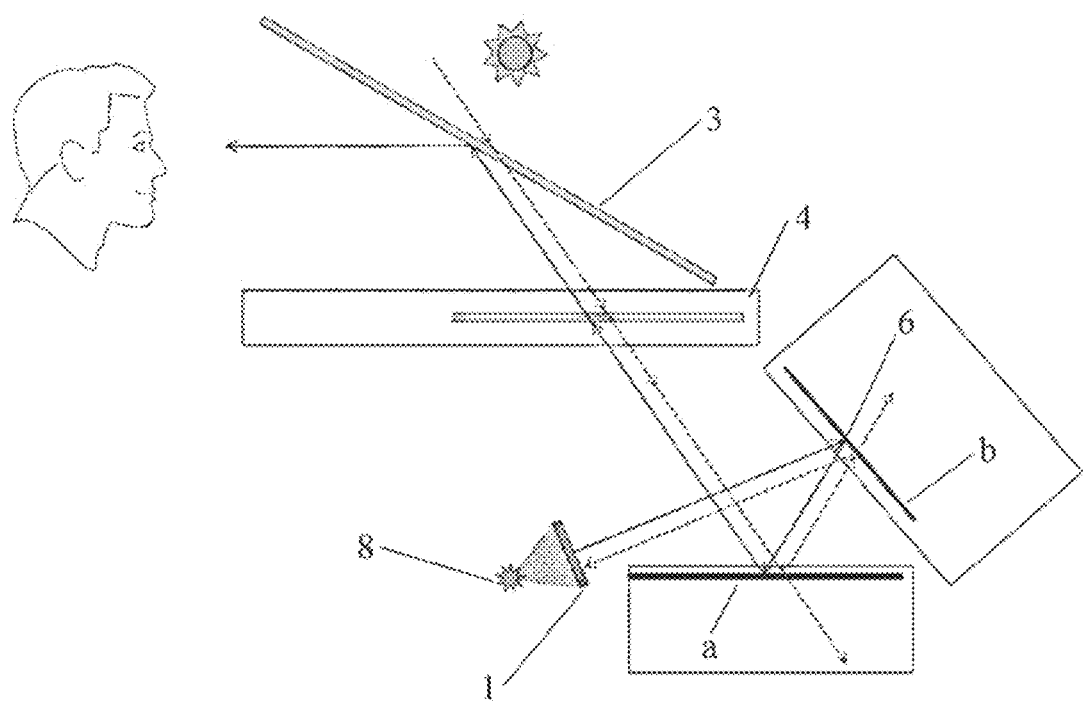
FIG. 5 illustrates an example of a first mirror being made in the form of a selective dichroic mirror according to an example embodiment.

FIG. 5 illustrates an example of a first mirror being a selective dichroic mirror according to an example embodiment.

Referring to FIG. 5, an example embodiment may include a selective dichroic mirror instead of the selective dichroic filter 5, where the first mirror a is configured as a selective dichroic mirror. In this case, the selective dichroic mirror may be made in the form of a conventional mirror with a selective dichroic coating applied thereto. In this example embodiment, solar radiation may pass through the screen 3 and be incident the polarizing filter 4.

The polarizing filter 4 may pass only a linearly polarized portion of the solar radiation, thereby eliminating up to 50% of the solar illumination. The polarized radiation may be incident on the first mirror a, which reflects only the polarized radiation of the operating range of the display 1, an ultraviolet component of solar radiation and an infrared component of solar radiation, and absorbs the rest of the visible radiation. Further, the remaining solar radiation is incident on the second mirror b, on which the coating 6 is applied. The second mirror b on which the coating 6 is applied may absorb or transmit the ultraviolet component and the infrared component of the solar radiation, and reflect the remaining part of the radiation. Accordingly, the processed solar radiation may have a very low intensity and power and may not heat the display 1.

A radiation source (or light source) 8 may be used as a backlight and be located behind the display 1 to illuminate the display 1.

Figure 6:
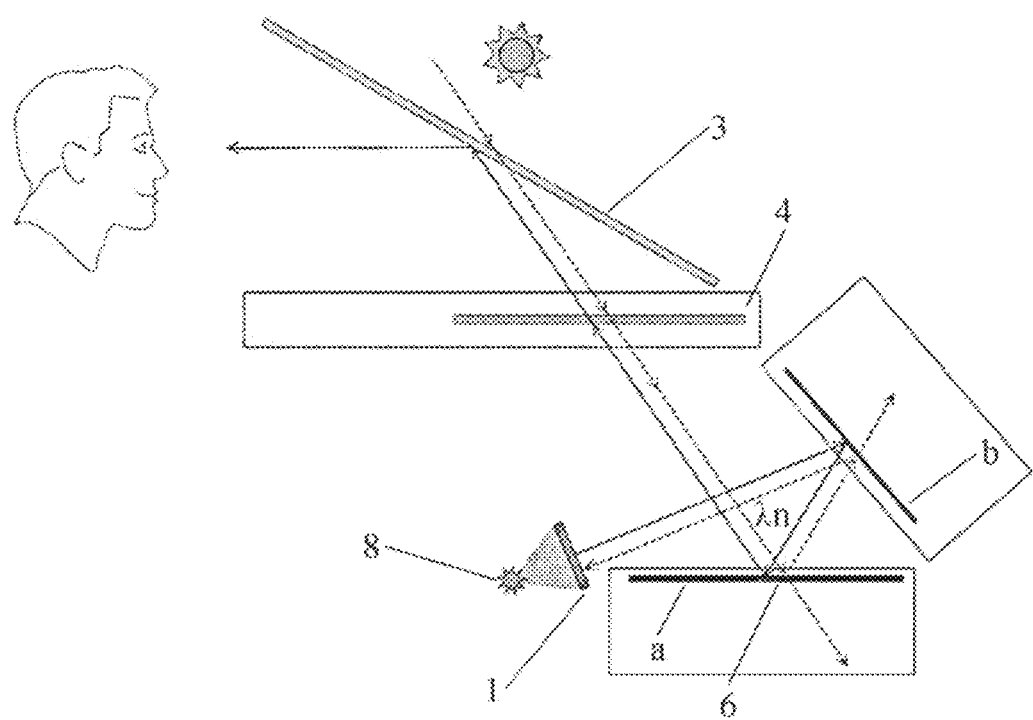
FIG. 6 illustrates an example of a second mirror being made in the form of a selective dichroic mirror according to an example embodiment.

FIG. 6 illustrates an example of a second mirror being a selective dichroic mirror according to an example embodiment.

FIG. 6 illustrates an example embodiment in which a first mirror a is configured to transmit or absorb an ultraviolet component of solar radiation and an infrared component of solar radiation and to reflect the remainder of the spectrum. The second mirror b includes a coating configured to reflect radiation of an operating range of the display and absorb all other wavelengths (the remaining visible radiation) of solar radiation. The second mirror b is configured to operate as a selective dichroic mirror.

In this example embodiment, solar radiation passes through the screen 3 and is incident on the polarizing filter 4. The polarizing filter 4 passes only a linearly polarized portion of the solar radiation, thereby eliminating up to 50% of the solar illumination. The polarized radiation is incident on the first mirror a, on which the coating 6 is applied. The first mirror a may absorb or transmit the ultraviolet component and the infrared component of the solar radiation, and reflect the remaining part of the radiation. The remaining radiation enters the second mirror b, which reflects only the radiation of the operating range of the display 1 and absorbs the rest of the visible radiation. The remaining solar radiation is incident on the display 1.

A radiation source (or light source) 8 may be used as a backlight and be located behind the display 1 to illuminate the display 1.

Solar radiation incident on the screen 3 is unpolarized. Solar radiation passing through the polarizing filter 4 does not change its spectral composition, but the amplitude of solar radiation is changed, since only one type of polarized light passes based on the polarizing filter 4. Unpolarized radiation may be represented as two orthogonal polarizations, and the amplitude of all radiation is divided equally between these two orthogonal polarizations. Therefore, the polarizing filter 4, which eliminates unpolarized radiation, only transmits 50% of the solar radiation. The polarizing filter 4 may be a combination of a linear s-polarizer and a quarter-wave plate, a combination of a linear p-polarizer and a quarter-wave plate, a circular polarizer with left polarization, a circular polarizer with right polarization, a linear s-polarizer, or a p-polarizer. Any combination of polarization elements may also be used, wherein the polarization axes of the polarizing filter elements must correspond to the polarization of the display and the reflectivity of the screen. For example, the polarization axes of the polarizer and the display must coincide. In addition, since the degree of reflection of radiation from the screen 3 into the user's eyes depends on the polarization of the radiation, during the manufacture of the proposed system, it may be necessary to consider the consistency of the polarization of the radiation and the type of used screen.

Figure 7:
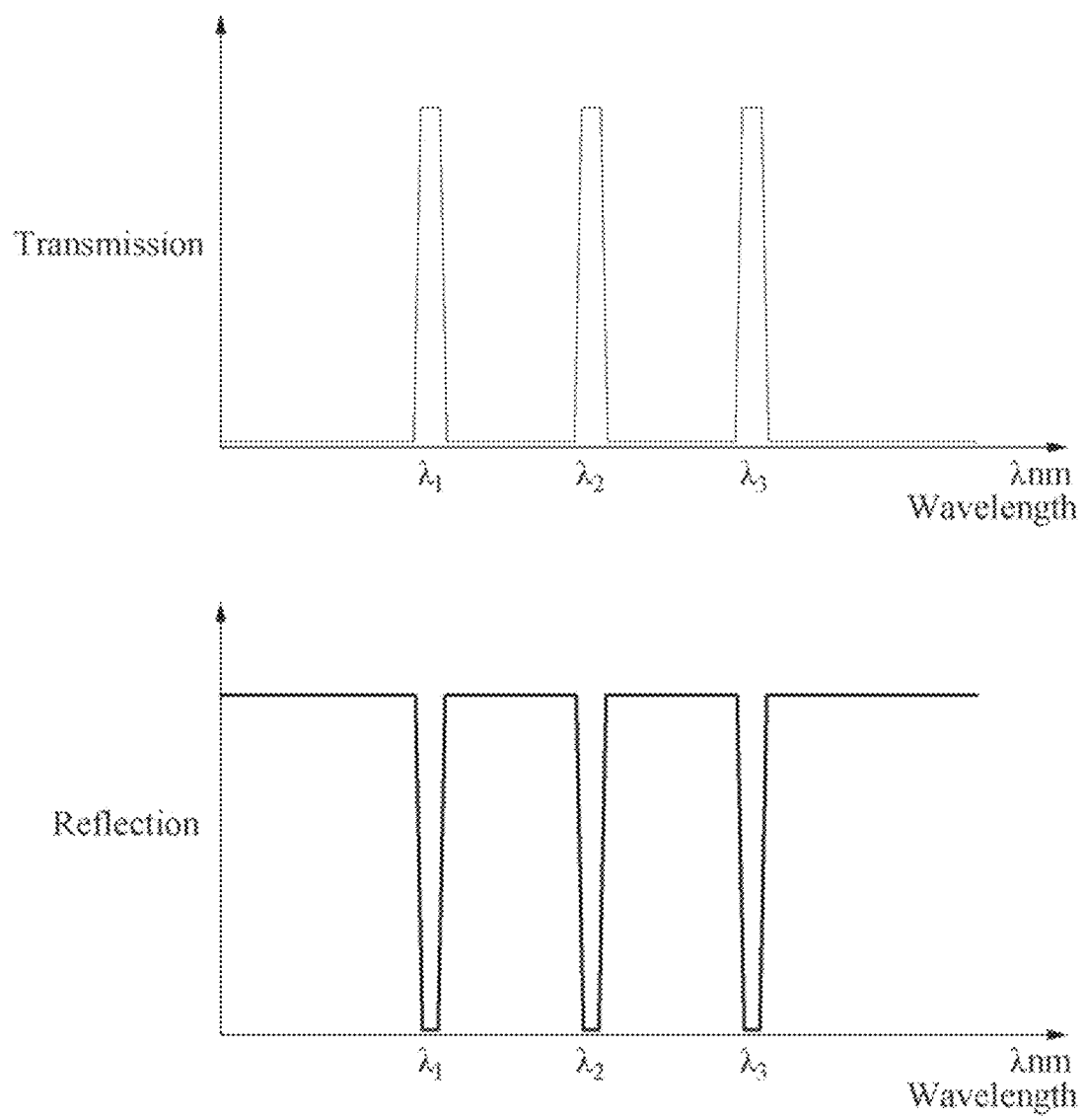
FIG. 7 illustrates a schematic transmission spectrum of a selective dichroic filter according to an example embodiment.

FIG. 7 illustrates a schematic transmission spectrum of a selective dichroic filter according to an example embodiment.

A selective dichroic filter 5 has a transmission spectrum shown schematically in FIG. 7. The selective dichroic filter passes only the wavelengths corresponding to the wavelengths at which the display operates, and reflects the other wavelengths. The selective dichroic filter removes about 17.5% of solar radiation. The selective dichroic filter excludes radiation from the visible region of the solar radiation spectrum and transmits only radiation in the operating range of the display 1. FIG. 7 shows the wavelengths $\lambda 1, \lambda 2, \lambda 3 \ldots$, which passes the selective dichroic filter, and which are the operating wavelengths of the display 1 used in the system, that is, the spectral range of the display.

When the polarizing filter 4 and the selective dichroic filter 5 are used, the white balance in a virtual image projected by the display 1 onto a transparent screen may be improved. When a display 1 with a wide spectrum of radiation is used, the virtual image obtained on the transparent screen may not have sufficient contrast. As a color image is formed from three components R, G, and B of the spectrum, the narrower the bands of each spectrum, the more accurate the color rendering of the virtual image is. To increase the contrast and improve the white balance, the polarizing filter 4 and the selective dichroic filter 5 may be designed to pass only a certain required operating wavelength range of the display 1.

The second mirror b or filter is configured to absorb or transmit the ultraviolet component of solar radiation and the infrared component of solar radiation, and may eliminate about 28.5% of solar radiation. This element may be a substrate with a multilayer thin-film coating or a filter that transmits, absorbs or reflects the ultraviolet (UV) and infrared (IR) parts of the spectrum and reflects or transmits the visible part of the spectrum. Also, this element may be made to absorb only IR radiation, and the manufacture of such a filter (or mirror) may cost much less than the manufacture of a filter or mirror with absorption of both ultraviolet and infrared components of solar radiation.

The first mirror a may be a fully or partially reflective mirror with, for example, an aspherical, flat, or arbitrary surface shape. Other suitable optical elements and lens systems may be used instead of a mirror.

The screen 3, onto which the image from the display 1 is projected, may be, for example, a car windshield, a translucent screen, a screen or combiner that combines real and virtual images used in virtual reality helmets, a partially reflecting mirror, or a holographic optical element.

The display 1 may emit elliptically polarized or non-polarized light. The display 1 may be a liquid-crystal display (LCD), or a diffuser in combination with: a liquid crystal on silicon (LCoS) display, a digital light processing (DLP) display, or a microelectromechanical systems (MEMS) display.

A radiation source may be a backlight unit with RGB (or white) LEDs, an RGB (or white) LED lighting system, a laser projection system, or a halogen lamp.

The characteristics of all elements of the system may be selected to match the characteristics of the display 1 used.

Figure 8A:
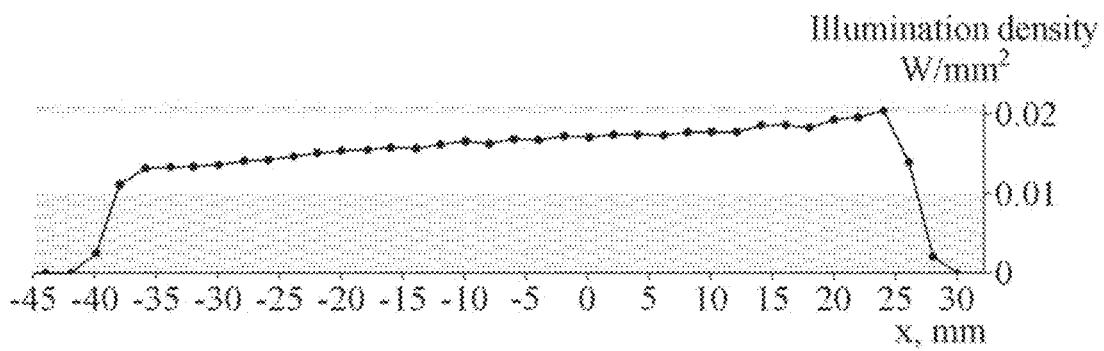
FIG. 8A illustrates a solar illumination density graph of a display without a system according to an example embodiment.

FIG. 8A illustrates a solar illumination density graph of a display without a system according to an example embodiment.

In the case where the system according to example embodiments is not included, the solar radiation incident to the display is 50 W in power and 21.2 kW/m² in maximum illumination density.

In all graphs of FIGS. 8A to 8D, the X-axis corresponds to the X coordinate (mm) on the display, where 0 is the middle of the display along the X-axis. The Y-axis corresponds to the illumination density (W/mm²).

Figure 8B:
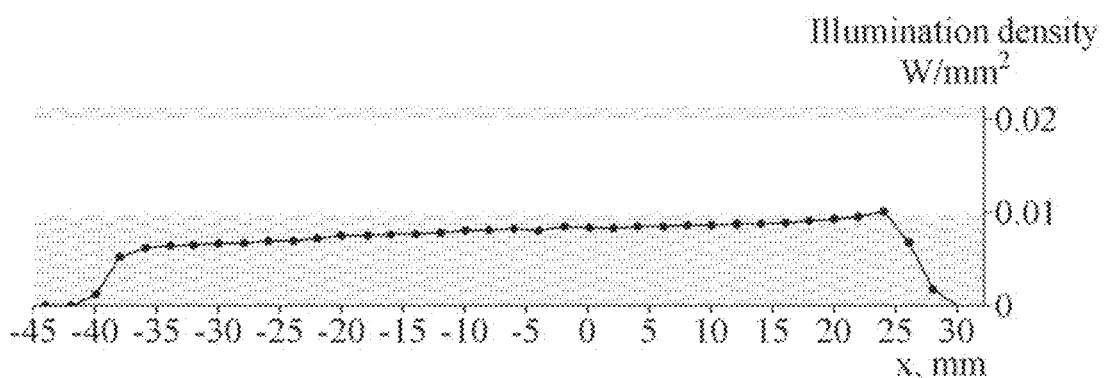
FIG. 8B illustrates a solar illumination density graph of a display in the case of a screen projection system including only a linear s-polarizer and a quarter-wave plate according to an example embodiment.

FIG. 8B illustrates a solar illumination density graph of a display in the case of a screen projection system including a linear s-polarizer and a quarter-wave plate according to an example embodiment. In this case, the power of solar radiation is 24.4 W, which is much lower than 50 W in FIG. 8A, and the illumination density is 10.3 kW/m².

Figure 8C:
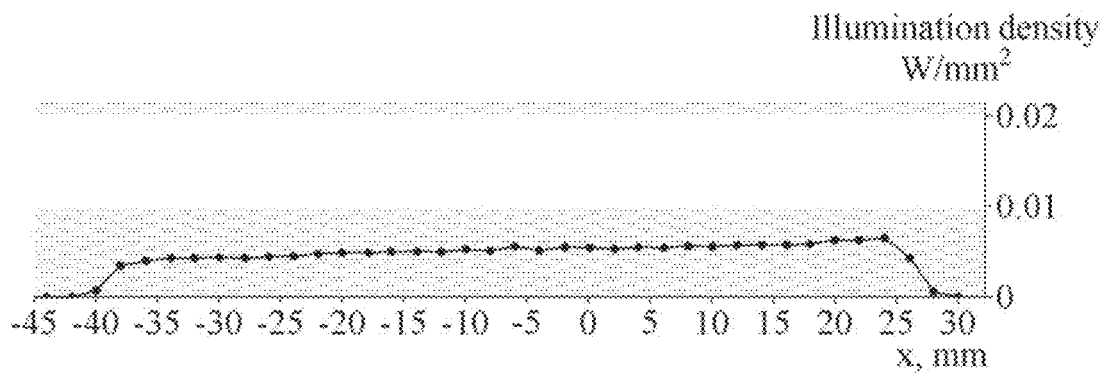
FIG. 8C illustrates a solar illumination density graph of a display in the case of applying an image projection system to a screen including only a linear s-polarizer, a quarter-wave plate, and a selective dichroic filter according to an example embodiment.

FIG. 8C illustrates a solar illumination density graph of a display in the case of applying an image projection system to a screen including a linear s-polarizer, a quarter-wave plate, and a selective dichroic filter according to an example embodiment. In this case, the power of solar radiation is 15.7 W, which is much lower than 50 W in FIG. 8A, and the illumination density is 6.6 kW/m².

Figure 8D:
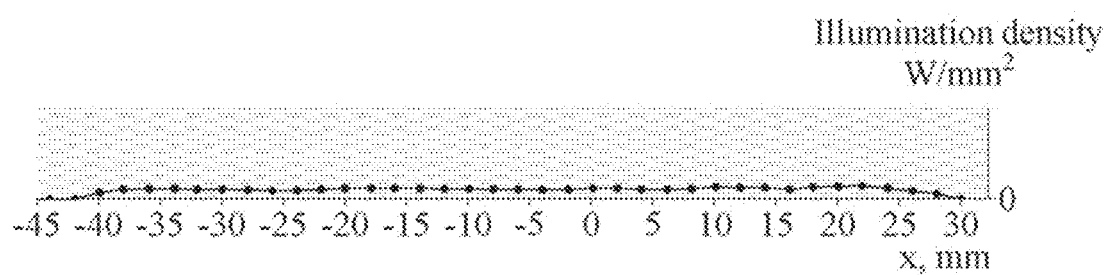
FIG. 8D illustrates a graph of the solar illumination density of a display in the case of using an image projection system with the effect of eliminating the influence of solar radiation, including a linear s-polarizer, a quarter-wave plate, a dichroic filter, and a filter that eliminates ultraviolet and infrared radiation components according to an example embodiment.

FIG. 8D illustrates a graph of the solar illumination density of a display in the case of using an image projection system with the effect of eliminating the influence of solar radiation, including a linear s-polarizer, a quarter-wave plate, a dichroic filter, and a filter that eliminates ultraviolet and infrared radiation components according to an example embodiment. In this case, the power of solar radiation is 2.07 W, which is much lower than 50 W in FIG. 8A, and the illumination density is 0.9 kW/m².

The system of example embodiments of the present disclosure may be used in projection displays, navigation systems, and outdoor advertising displays, in addition to head-up displays for vehicles.

The system of example embodiments, when used for a car dashboard, may be a body that is built into the dashboard. The housing may contain all the components of the system according to example embodiments and have a window for outputting radiation from the display to the windshield.

While example embodiments have been described above, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

While example embodiments have been illustrated and described above, it will be apparent to those skilled in the art that modifications and variations could be made without departing from the scope as defined by the appended claims and their equivalents.

What is claimed is:

1. A system for projection of an image, the system comprising:
    a screen;
    a polarizing filter;
    a selective dichroic filter;
    a first mirror;
    a second mirror; and
    a display,
    wherein,
    wherein the polarizing filter, the selective dichroic filter, the first mirror, and the second mirror are disposed between the screen and the display, wherein the polarizing filter is configured to polarize solar radiation transmitted through the screen and incident on the polarizing filter, wherein the selective dichroic filter is disposed on a side of the polarizing filter opposite to the screen, the selective dichroic filter being configured to transmit at least one of radiation of an operating range of the display among the radiation polarized by the polarizing filter, an ultraviolet component of the radiation, and an infrared component of the radiation, and to reflect remaining radiation corresponding to wavelengths that are not transmitted by selective dichroic filter to the first mirror, wherein the first mirror is configured to reflect radiation transmitted through the selective dichroic filter to the second mirror, and wherein the second mirror is configured to transmit or absorb at least one of an ultraviolet component of the radiation and an infrared component of the radiation reflected from the first mirror, and to direct remaining radiation corresponding to wavelengths that are not transmitted or absorbed by the second mirror, among the radiation reflected from the first mirror, through the polarizing filter to the display.

2. The system of claim 1, further comprising:
a radiation source located on a side of the display opposite to the screen.

3. The system of claim 1, wherein the polarizing filter is one of a linear s-polarizer with a quarter-wave plate, a linear p-polarizer with a quarter-wave plate, a circular polarizer with left polarization, a circular polarizer with right polarization, a linear s-polarizer, and a linear p-polarizer.

4. The system of claim 1, wherein the polarizing filter comprises:
   a linear s-polarizer configured to transmit linear s-polarized radiation; and
   a quarter-wave plate configured to convert the linear s-polarized radiation to a circular polarized radiation.

5. A head-up-display comprising the system of claim 1.

6. A system for projection of an image, the system comprising:
   a screen;
   a polarizing filter;
   a selective dichroic filter;
   a filter;
   a first mirror;
   a second mirror; and
   a display,
   wherein the polarizing filter, the selective dichroic filter, the first mirror, and the second mirror are disposed between the screen and the display,
   wherein the polarizing filter is configured to polarize solar radiation transmitted through the screen,
   wherein the selective dichroic filter is disposed on a side of the polarizing filter opposite to the screen, the selective dichroic filter being configured to transmit at least one of radiation of an operating range of the display among the radiation polarized by the polarizing filter, an ultraviolet component of the radiation, and an infrared component of the radiation, and to reflect remaining radiation wavelengths,
   wherein the filter is configured to absorb the ultraviolet component of the radiation and the infrared component of the radiation and to transmit radiation corresponding to all other wavelengths that are not absorbed by the filter,
   wherein the first mirror is configured to reflect radiation transmitted through the polarizing filter, the selective dichroic filter, and the filter to the second mirror, and
   wherein the second mirror is configured to reflect the radiation reflected from the first mirror through the polarizing filter to the display.

7. The system of claim 6, further comprising:
a radiation source disposed on a side of the display opposite to the screen.

8. The system of claim 6, wherein the filter is disposed between the screen and the polarizing filter or on a side of the selective dichroic filter opposite to the polarizing filter.

9. The system of claim 6, wherein the polarizing filter is one of a linear s-polarizer with a quarter-wave plate, a linear p-polarizer with a quarter-wave plate, a circular polarizer with left polarization, a circular polarizer with right polarization, a linear s-polarizer, and a linear p-polarizer.

10. A system for projection of an image, the system comprising:
    a screen;
    a first mirror;
    a second mirror;
    a polarizing filter;
    a selective dichroic filter; and
    a display,
    wherein the first mirror, the second mirror, the polarizing filter, and the selective dichroic filter are disposed between the screen and the display,
    wherein the first mirror is configured to reflect solar radiation transmitted through the screen and the selective dichroic filter to the second mirror,
    wherein the second mirror is configured to transmit or absorb at least one of an ultraviolet component of the solar radiation and an infrared component of the solar radiation, and to reflect radiation corresponding to remaining wavelengths that are not transmitted or absorbed by the second mirror, among the solar radiation, through the polarizing filter to the display,
    wherein the polarizing filter is configured to polarize the radiation reflected from the second mirror, and
    wherein the selective dichroic filter is disposed on a side of the polarizing filter opposite to the screen, the selective dichroic filter being configured to transmit radiation of an operating range of the display among the radiation polarized through the polarizing filter, to direct the transmitted radiation to the display, and to reflect radiation corresponding to remaining wavelengths that are not transmitted by the selective dichroic filter.

11. The system of claim 10, further comprising:
a radiation source disposed on a side of the display opposite to the screen.

12. The system of claim 10, wherein the polarizing filter is one of a linear s-polarizer with a quarter-wave plate, a linear p-polarizer with a quarter-wave plate, a circular polarizer with left polarization, a circular polarizer with right polarization, a linear s-polarizer, and a linear p-polarizer.

13. A system for projection of an image, the system comprising:
    a screen;
    a polarizing filter;
    a first mirror;
    a second mirror; and
    a display,
    wherein the polarizing filter, the first mirror, and the second mirror are disposed between the screen and the display, wherein the polarizing filter is configured to polarize solar radiation, wherein the first mirror is configured to reflect at least one of a radiation of an operating range of the display among the radiation polarized through the polarizing filter, an ultraviolet component of the polarized radiation, and an infrared component of the polarized radiation to the second mirror, and to absorb radiation corresponding to all other wavelengths that are not reflected by the first mirror, among the radiation polarized through the polarizing filter and filtered through the selective dichroic filter, and wherein the second mirror is configured to transmit or absorb at least one of an ultraviolet component of the radiation reflected from the first mirror and an infrared component of the radiation reflected from the first mirror, and to reflect radiation corresponding to all other wavelengths that are not transmitted or absorbed by the second mirror, among the radiation reflected from the first mirror and direct the reflected radiation through the polarizing filter to the display.

14. The system of claim 13, wherein the first mirror is a selective dichroic mirror.

15. The system of claim 13, further comprising:
a radiation source disposed on a side of the display opposite to the screen.

16. The system of claim 13, wherein the polarizing filter is one of a linear s-polarizer with a quarter-wave plate, a linear p-polarizer with a quarter-wave plate, a circular polarizer with left polarization, a circular polarizer with right polarization, a linear s-polarizer, and a linear p-polarizer.

17. A system for projection of an image, the system comprising:
a screen;
a polarizing filter;
a selective dichroic filter;
a first mirror;
a second mirror; and
a display,
wherein the polarizing filter, the selective dichroic filter, the first mirror, and the second mirror are disposed between the screen and the display,
wherein the selective dichroic filter is disposed on a side of the polarizing filter opposite to the screen,
wherein the polarizing filter is configured to polarize solar radiation,
wherein the first mirror is configured to transmit or absorb at least one of an ultraviolet component of the radiation polarized through the polarizing filter and an infrared component of the radiation polarized through the polarizing filter, and to reflect radiation corresponding to all other wavelengths that are not transmitted or absorbed by the first mirror, among the radiation polarized through the polarizing filter and filtered through the selective dichroic filter, to the second mirror, and
wherein the second mirror is configured to reflect radiation of an operating range of the display, among the radiation reflected from the first mirror, to the display, and to absorb all other wavelengths that are not reflected by the second mirror, among the radiation reflected from the first mirror.

18. The system of claim 17, wherein the second mirror is a selective dichroic mirror.

19. The system of claim 17, further comprising:
a radiation source disposed on a side of the display opposite to the screen.

20. The system of claim 17, wherein the polarizing filter is one of a linear s-polarizer with a quarter-wave plate, a linear p-polarizer with a quarter-wave plate, a circular polarizer with left polarization, a circular polarizer with right polarization, a linear s-polarizer, and a linear p-polarizer.

* * * * *